US 6,567,234 B2

(12) United States Patent
Matsuoka et al.

(10) Patent No.: US 6,567,234 B2
(45) Date of Patent: May 20, 2003

(54) MAGNETIC RECORDING AND REPRODUCING APPARATUS

(75) Inventors: Hidetoshi Matsuoka, Tokyo (JP); Michihiko Tsunekawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/236,388

(22) Filed: Sep. 5, 2002

(65) Prior Publication Data

US 2003/0011924 A1 Jan. 16, 2003

Related U.S. Application Data

(62) Division of application No. 09/705,409, filed on Nov. 3, 2000, now Pat. No. 6,466,395.

(30) Foreign Application Priority Data

| Nov. 8, 1999 | (JP) | ............................................. 11-316409 |
| Nov. 8, 1999 | (JP) | ............................................. 11-316470 |
| Jan. 26, 2000 | (JP) | ........................................ 2000-017066 |

(51) Int. Cl.⁷ ............................................. G11B 15/665
(52) U.S. Cl. ..................................... 360/96.5; 360/85
(58) Field of Search ............................... 360/96.5, 96.3, 360/96.6, 96.4, 85, 83, 84; 242/340, 342

(56) References Cited

U.S. PATENT DOCUMENTS 6,008,963 A * 12/1999 Nemoto et al. ............... 360/85
6,122,136 A * 9/2000 Tomitaka ...................... 360/85
6,288,865 B1 * 9/2001 Hirabayashi et al. ....... 360/96.3

* cited by examiner

Primary Examiner—Robert S. Tupper
(74) Attorney, Agent, or Firm—Robin, Blecker & Daley

(57) ABSTRACT

A magnetic recording and reproducing apparatus includes guide posts arranged to pull out a tape-shaped recording medium from a cassette and wrap the tape-shaped recording medium around a drum, guide members arranged to support the guide posts, arms arranged to move the guide members, and arm driving parts arranged to cause the arms to swing, wherein the arms and the arm driving parts are disposed respectively on different sides of a chassis.

4 Claims, 17 Drawing Sheets

MAGNETIC RECORDING AND REPRODUCING APPARATUS

CROSS REFERENCE TO RELATED APPLICATIONS

This application is a divisional application of application Ser. No. 09/705,409, filed Nov. 3, 2000 U.S. Pat. No. 6,466,395.

BACKGROUND OF THE INVENTION

1. Field of the Invention

The present invention relates to a magnetic recording and reproducing apparatus and, more particularly, to a magnetic recording and reproducing apparatus arranged to perform magnetic recording and reproduction on or from a tape-shaped recording medium by pulling our the tape-shaped recording medium from a cassette and wrapping the tape-shaped recording medium around a drum.

2. Description of Related Art

FIG. 18 is a plan view showing, by way of example, the arrangement of a conventional magnetic recording and reproducing apparatus. A magnetic tape 101 serving as a recording medium is supplied from a supply reel 102 through a tension pole 103, tape guides 104, 105 and 106 to be wrapped around a rotary cylinder (drum) 107 which has recording and reproducing heads mounted thereon. After that, the magnetic tape 101 is taken up by a take-up reel 113 through tape guides 108 and 109, a tape driving capstan 110, a pinch roller 111 and another tape guide 112.

Referring next to FIG. 19 and FIGS. 20(a) and 20(b), a reel mount driving mechanism provided in the magnetic recording and reproducing apparatus is described below.

FIG. 19 is a side view of a supply reel mount driving mechanism which is shown in FIG. 18. The supply reel 102 (the take-up reel 113) is fitted on a reel shaft 115 (116), which is mounted on a slide chassis 114, to be rotatable around the reel shaft 115 (116). FIGS. 20(a) and 20(b) show, in an enlarged side view and a top view, respectively, the arrangement of the supply reel mount driving mechanism. The take-up reel mount driving mechanism is also arranged in exactly the same manner as the supply reel mount driving mechanism shown in FIGS. 20(a) and 20(b).

Referring to FIG. 18, the driving force of a capstan motor 150 which is disposed on a main chassis 117 is transmitted by means of gears 118 to 121, a belt (not shown), etc., to a gear 123 which is rotatably fitted on a shaft 122 mounted on the main chassis 117. The driving force transmitted to the gear 123 is transmitted further to a gear 126 which is rotatable around a shaft 125 mounted on a lever 124, which is arranged to be swingable around the shaft 122. The gear 126 and the lever 124 are arranged to engage each other through a torque transmitting means (not shown). The lever 124 is arranged to be caused by the rotation of the gear 123 to swing around the shaft 122. When the gear 123 rotates counterclockwise, the gear 126 meshes with a gear 127.

Referring to FIGS. 20(a) and 20(b), the details of the supply reel mount driving mechanism of the conventional arrangement are described below. The gear 127 is provided with a hysteresis plate 128 which is insert-molded. A gear 129 is provided with a yoke plate 130 which is insert-molded. A magnet 131 is magnetically attracted by the yoke plate 130. A reel claw 133 and a reel claw spring 134 are mounted on the gear 129. A reel cap 132 is press-fitted in the gear 129. The reel claw 133 is under an upward urging force of the reel claw spring 134. However, the position of the reel claw 133 is restricted by the reel cap 132.

The gears 127 and 129 are caused by the magnet 131 which is magnetically attracted by the gear 129 to be magnetically attracted and pulled to each other at a contact part 136 of the gear 127 and a contact part 137 of the gear 129 across a washer 135.

The supply reel 102 is rotatably fitted on the reel shaft 115 which is mounted on the slide chassis 114.

Here, when the gear 126 moves in the direction of an arrow "a" shown in FIG. 20(a) to mesh with the gear 127, a hysteresis loss brought about by the magnet 131 and the hysteresis plate 128 and a friction loss brought about by the contact part 136 of the gear 127, the contact part 137 of the gear 129 and the washer 135 cause a driving force to be transmitted from the gear 127 to the gear 129 with a certain fixed amount of torque.

Referring to FIG. 18, when the gear 123 rotates counterclockwise, the lever 124 swings counterclockwise around the shaft 122. Then, following the counterclockwise movement of the lever 124, the gear 126 moves, while rotating, up to such a position as to mesh with the gear 127. As a result, the gear 127 (and the supply real 102) rotates counterclockwise, i.e., in the direction of rewinding the tape 101 in this instance. Then, the tape 101, which is wound around a reel hub 138 shown in FIG. 20(a), is taken up and wound around the supply reel 102 by means of the reel claw 133.

In this instance, the magnetic tape 101 is taken up and wound with a certain fixed amount of torque produced by the above-stated torque transmission means (the hysteresis loss caused by the hysteresis plate 128 and the magnet 131 and the friction loss caused by the contacts parts 136 and 137 and the washer 135 as mentioned above).

Referring further to FIG. 18, a T(take-up)-reel-side soft brake 140 and a T-reel-side lock brake 141 are fitted on a shaft 139 mounted on the slide chassis 114, and a S(supply)-reel-side lock brake 143 is fitted on a shaft 142 mounted on the slide chassis 114. A loading motor 144 is arranged to operate, through a leading gear train (not shown), a mode lever (not shown), etc., to turn on and off the T-reel-side soft brake 140, the T-reel-side lock brake 141, the S-reel-side lock brake 143, etc., according to the operation mode of the magnetic recording and reproducing apparatus. The T-reel-side soft brake 140, the T-reel-side lock brake 141 and the S-reel-side lock brake 143 are arranged to apply soft and lock brakes by coming into contact or meshing with the gear 127 and the gear 129 shown in FIG. 20(a).

In the case of the conventional arrangement shown in FIG. 18, the reel mounts are disposed on the slide chassis 114. A torque limiter (clutch) mechanism is arranged inside each of the reel mounts. In addition to that, brake contact parts are also arranged at the reel mounts. Therefore, each of the reel mounts thus has a complex structural arrangement, which necessitates having a large thickness between the lower part of the cassette and the slide chassis 114, and which thus causes an increase in cost.

Further, in general, in the conventional magnetic recording and reproducing apparatuses, for example, a recorder deck of a camera-integrated-type video tape recorder (VTR) is arranged to have its mechanism installed on the upper surface of a chassis thereof because of the restrictions imposed by the shape and size of a cassette, the size of the apparatus itself, etc., and a stationary-type video tape recorder (VTR) is arranged, conversely, to have its mechanism installed on the back side of a chassis thereof.

However, the conventional magnetic recording and reproducing apparatuses, such as a recorder deck of a cameraintegrated-type VTR, have presented such a problem that it is necessary to arrange a large clearance between a tape transport member and a tape loading driving member for the purpose of preventing lubricative grease or the like in a driving part of the tape transport member from sticking to a tape transport part of the tape transport member to soil the tape, or for the purpose of preventing the tape transport member and the tape loading driving member from interfering with each other. The necessity of having such a large clearance hinders a reduction in size of the apparatus.

On the other hand, in the case of a stationary-type VTR, a tape loading driving part is arranged on the back surface of a chassis, while guide posts provided for guiding the travel of a tape are arranged on the upper surface of the chassis. Although such an arrangement effectively prevents the guide posts from being soiled by grease or the like, since the surface of the chassis is arranged to have guide grooves for a pulling-out action of the guide posts on the tape, it is impossible for such an arrangement to cope with a tape path arranged to perform a three-dimensional loading operation (i.e, when pulling out the tape, the guide posts move upward with respect to the surface of the chassis) designed for aiming at reducing the size of the apparatus as adopted in the tape transport system of video cameras.

Further, in a mechanical deck of the conventional video tape recorder (VTR), a capstan is mounted on a chassis, and sensors of various kinds are packaged on a flexible printed circuit board stuck to the chassis.

In the case of the conventional arrangement described above, however, it is necessary to have a certain space for mounting the capstan on the chassis. Such a mounting space hinders a reduction in size of the apparatus.

Further, the flexible printed circuit board is expensive. Besides, since there is provided wiring for the sensors separately from wiring for the capstan, it is necessary to have many connectors arranged for the wiring for the sensors and the wiring for the capstan. The use of many connectors causes an increase in cost of the apparatus.

BRIEF SUMMARY OF THE INVENTION

Such being the background, the invention is directed to the solution of the problems of the prior art described above. It is, therefore, an object of the invention to provide a reel mount driving mechanism which is arranged for a magnetic recording and reproducing apparatus to permit a reduction in number of parts of the apparatus, to be simple in structure of the apparatus, to permit a reduction in thickness of the apparatus and thus to permit a reduction in cost of the apparatus.

It is another object of the invention to provide a magnetic recording and reproducing apparatus arranged to prevent grease in a tape loading driving mechanism from sticking to guide posts, to enable guide members to perform the above-mentioned three-dimensional loading operation, and to enhance the reliability of traveling of a tape and a reduction in size of the apparatus.

It is a further object of the invention to provide a magnetic recording and reproducing apparatus arranged to permit a reduction in size and cost thereof.

To attain the above objects, in accordance with an aspect of the invention, there is provided a magnetic recording and reproducing apparatus, which comprises guide posts arranged to pull out a tape-shaped recording medium from a cassette and wrap the tape-shaped recording medium around a drum, guide members arranged to support the guide posts, arms arranged to move the guide members, and arm driving parts arranged to cause the arms to swing, wherein the arms and the arm driving parts are disposed respectively on different sides of a chassis.

These and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings, which show a recorder deck portion of a camera-integrated-type video tape recorder (VTR), serving as a magnetic recording and reproducing apparatus according to the embodiment.

Figure 1:
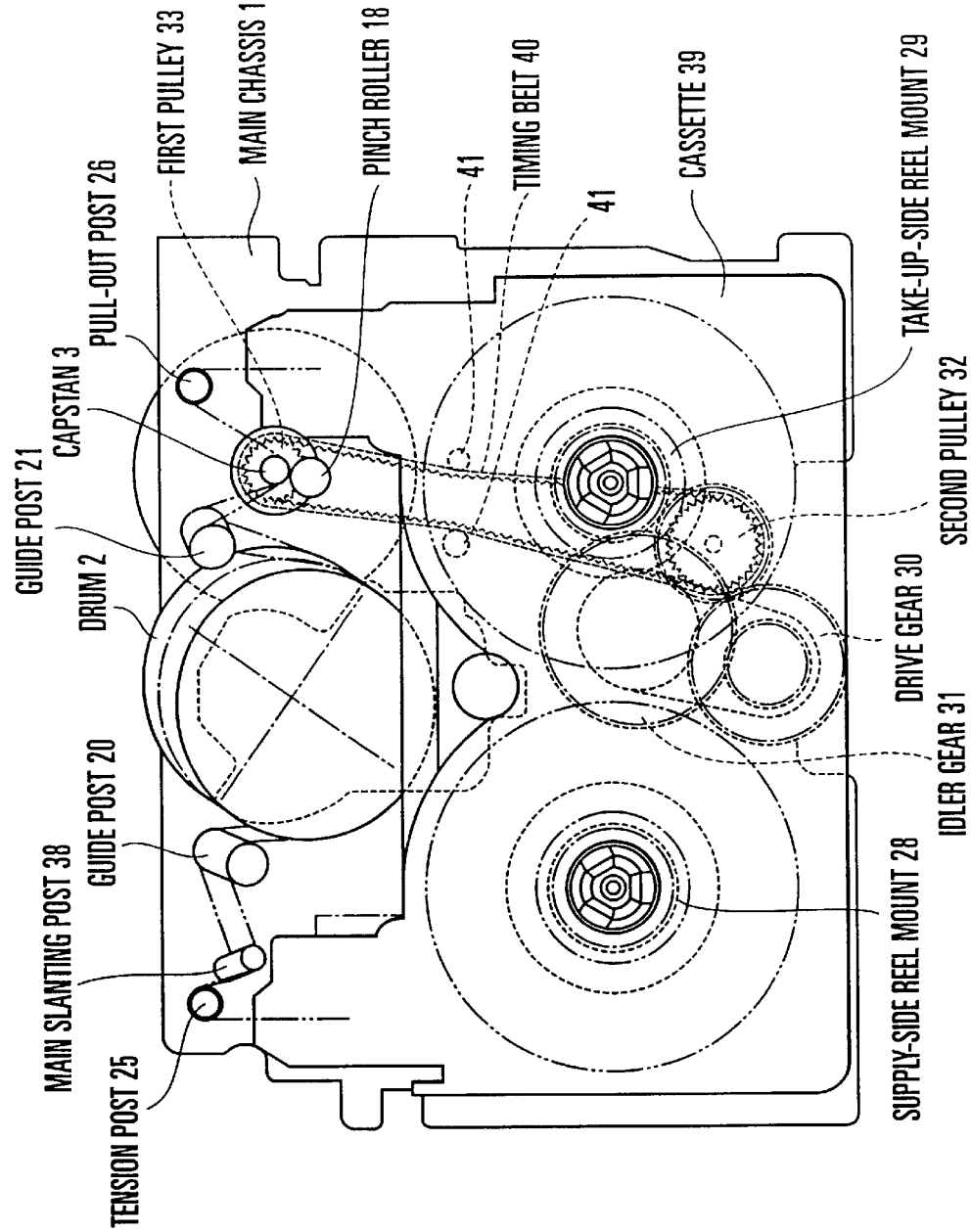
FIG. 1 is a diagram showing the positional relation between a tape cassette and drum guide posts obtained when a camera-integrated-type video tape recorder (VTR), serving as a magnetic recording and reproducing apparatus according to an embodiment of the invention, is in a recording or reproducing state, and also showing the manner of transmission of a driving force in a reel mount driving mechanism.

FIG. 1 is a diagram showing the positional relation between a tape cassette and drum guide posts obtained when the camera-integrated-type video tape recorder (VTR) is in a recording or reproducing state, and also showing the manner of transmission of a driving force in a reel mount driving mechanism.

Referring to FIG. 1, reference numeral 1 denotes a main chassis of the VTR. A rotary drum 2 has recording and reproducing heads disposed thereon. A capstan 3 is arranged on the main chassis 1 to be rotatable for transporting a tape. A cassette 39 is loaded on the VTR in a recording or reproducing position. A tension post 25 is arranged to impart a suitable amount of tension to the tape. A main slanting post 38 is arranged on the side of a supply reel (hereinafter referred to as the supply side). A supply-side drum-wrapping guide post 20 is arranged to decide the slanting angle of wrapping the tape around the rotary drum 2 on the supply side. A take-up-side drum-wrapping guide post 21 is arranged to decide the slanting angle of wrapping the tape around the rotary drum 2 on the side of a take-up reel (hereinafter referred to as the take-up side). A take-up-side pullout post 26 is arranged to pull the tape out from the cassette on the take-up side. A supply-side reel mount 28 is disposed on the supply side. A take-up-side reel mount 29 is disposed on the take-up side. A first pulley 33 is formed to be coaxial with the capstan 3. A timing belt 40 is arranged to transmit the driving force of the capstan 3. Roller 41 are arranged to guide the timing belt 40. A second pulley 32 is arranged to have the driving force transmitted from the first pulley 33 through the timing belt 40. A drive gear 30 is arranged to have a torque limiter. An idler gear 31 is arranged to transmit the driving force by being driven to rotate through the first pulley 33 which is coaxial with the capstan 3, the timing belt 40, the second pulley 32 and the drive gear 30 in such a way as to selectively mesh either with the supply-side reel mount 28 or the take-upside reel mount 29 according to the direction of rotation of the drive gear 30. A pinch roller 18 is arranged to be pressed against the capstan 3 across the tape so as to transport the tape.

Figure 2:
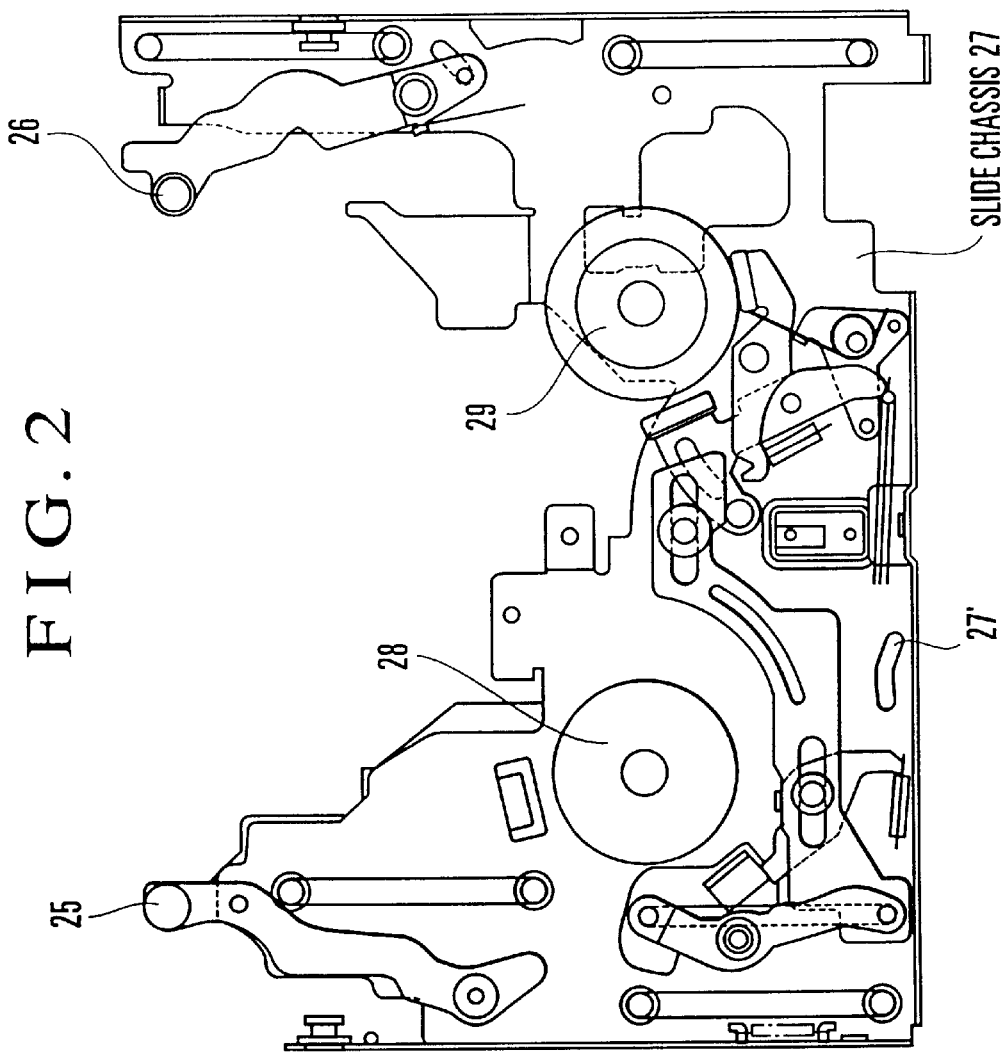
FIG. 2 is a diagram showing a slide chassis, which is supported to be slidable relative to a main chassis between a cassette loading position and a recording and reproducing position in the embodiment.

FIG. 2 is a diagram showing a slide chassis 27, which is supported to be slidable relative to the main chassis 1 between a cassette loading position and a recording and reproducing position.

The tension post 25 and the take-up-side pullout post 26 are rotatably supported by the slide chassis 27 through a link mechanism. Further, the supply-side reel mount 28 and the take-up-side reel mount 29 are also rotatably supported by the slide chassis 27. The details of the reel mounts 28 and 29 will be described later herein with reference to FIG. 9 to FIGS. 11(a) and 11(b).

A cam part 27' which is formed on the slide chassis 27 engages a pin 9a of a slide lever 9 (shown in FIG. 3) disposed on the main chassis 1, so as to cause the slide chassis 27 to slide back and forth with respect to the main chassis 1.

Figure 3:
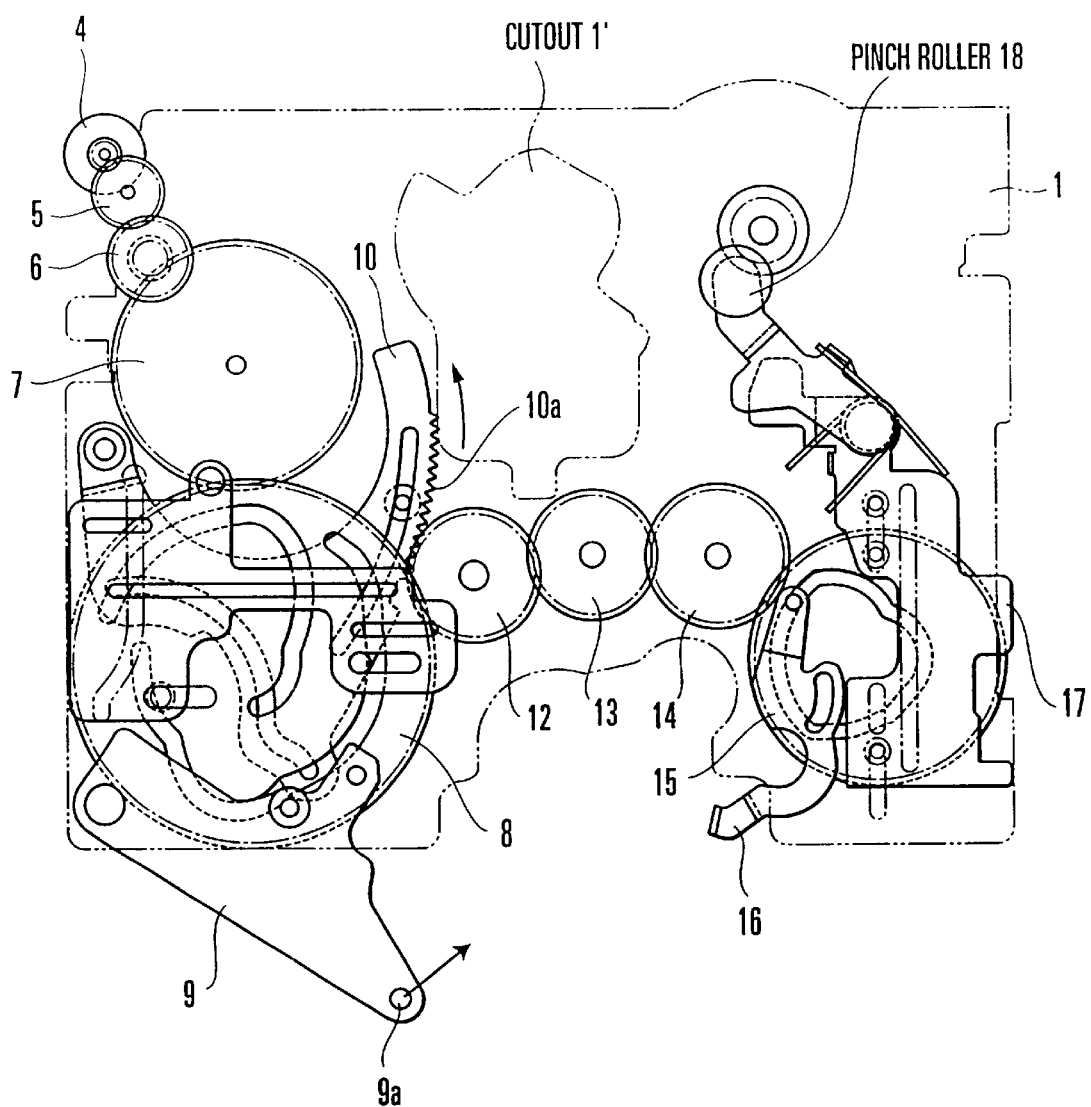
FIG. 3 is a top look-through view showing a driving mechanism disposed on the main chassis in the embodiment.

FIG. 3 is a top look-through view showing a mechanism disposed on the main chassis 1, as viewed from the upper surface of the main chassis 1. In actuality, this mechanism is disposed on the reverse side of the main chassis 1.

In FIG. 3, reference numeral 4 denotes a loading motor. Gears 5, 6 and 7 are arranged to transmit the rotation of the loading motor 4. Reference numeral 8 denotes a first cam gear. The slide lever 9 is arranged to cause the slide chassis 27 to slide by having the pin 9a engage the cam part 27' of the slide chassis 27. A loading lever 10 has a gear part 10a and is arranged to rotate by having the gear part 10a mesh with a gear 22', which will be described later. There are further provided relay gears 12, 13 and 14, a second cam gear 15, a brake driving lever 16, a pinch driving lever 17, and the pinch roller 18. A cutout 1' is formed in the main chassis 1. The function of the cutout 1' will be described later. Lubricative grease is applied to these parts of the mechanism so as to smooth their actions.

Figure 4:
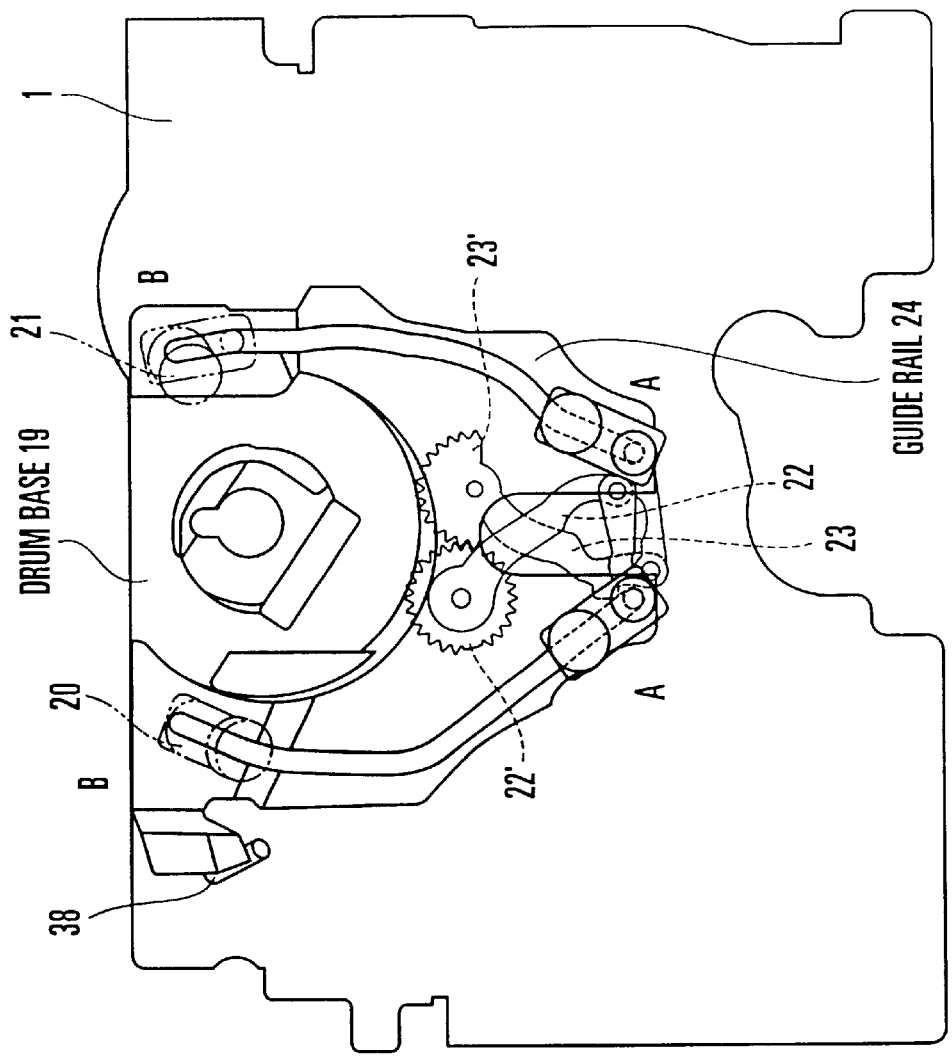
FIG. 4 is a diagram showing a guide post driving mechanism in the embodiment.
Figure 5:
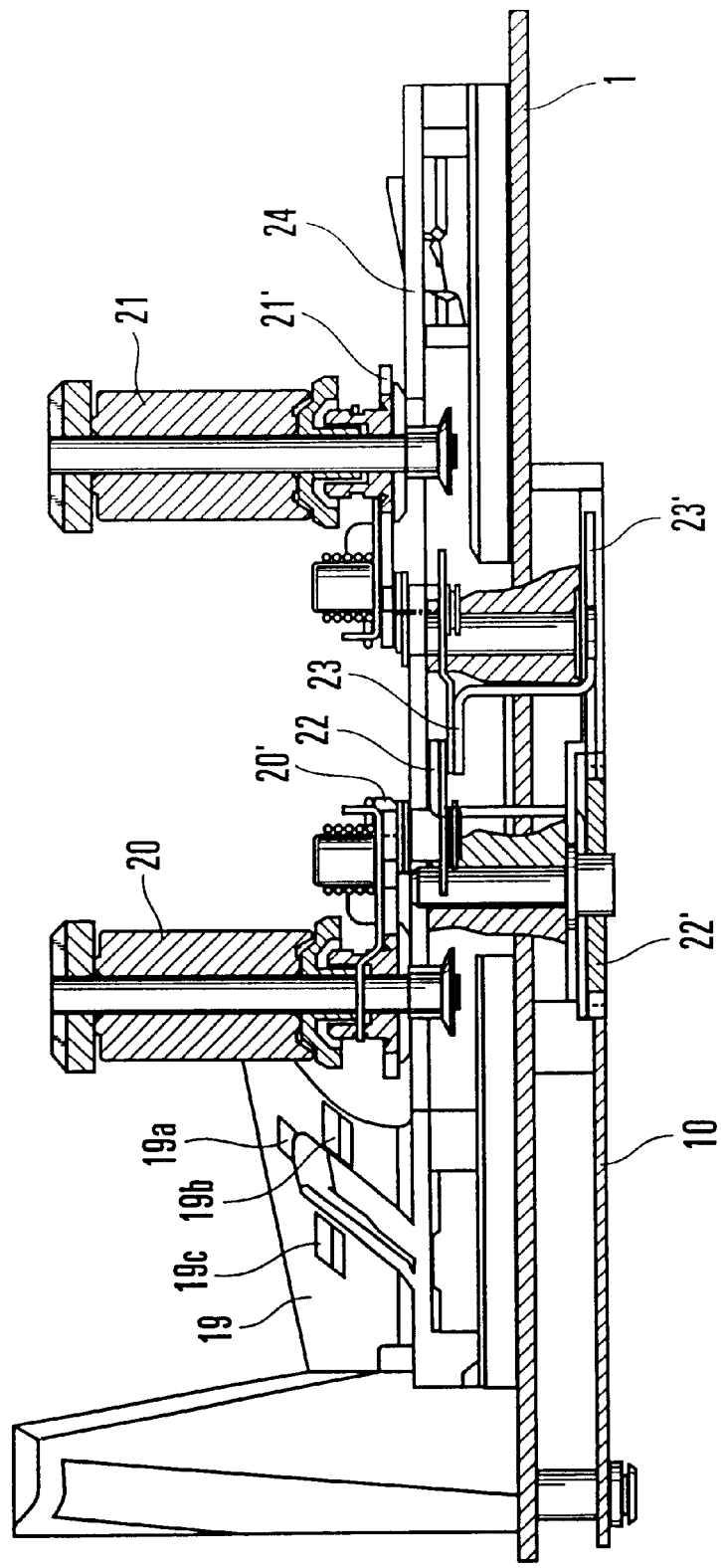
FIG. 5 is a side view showing the guide post driving mechanism in the embodiment.
Figure 6:
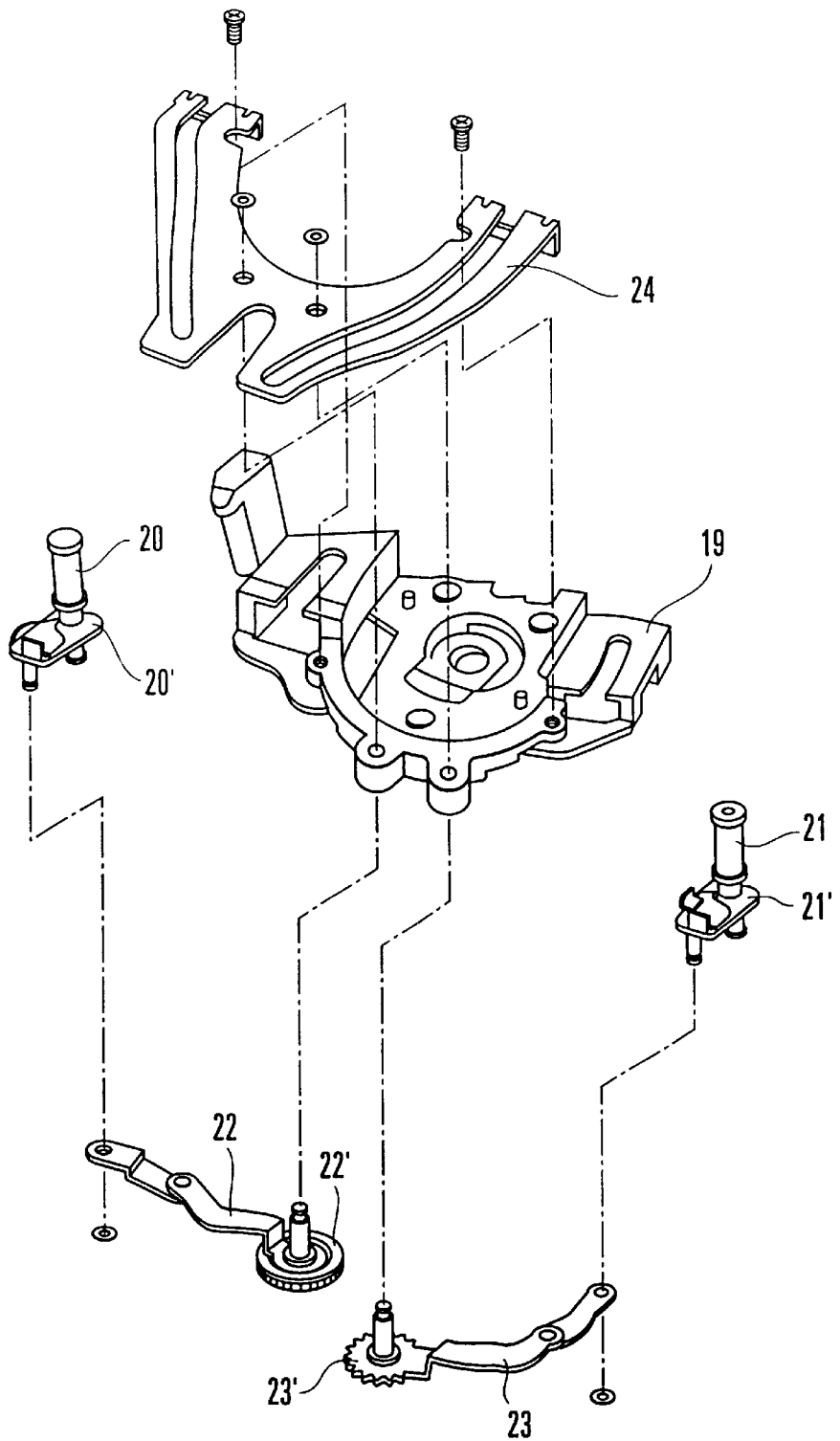
FIG. 6 is an exploded perspective view showing the guide post driving mechanism in the embodiment.

FIG. 4 is a top view of a tape guide post driving mechanism. FIG. 5 is a side view of the tape guide post driving mechanism. FIG. 6 is an exploded perspective view of the tape guide post driving mechanism.

In FIG. 4, the tape guide post driving mechanism is shown in a first position A at which the tape guide posts 20 and 21 are located on the inner side of the tape of the cassette loaded to be ready for pulling the tape out from the cassette, and also in a second position B at which the tape pulled out from the cassette is completely wrapped around the periphery of the rotary drum 2. In other words, the first and second positions A and B of the tape guide post driving mechanism are shown in an overlapped state in FIG. 4.

A drum base 19 is arranged to support the drum 2 and is provided with a positioning part for positioning the guide posts 20 and 21 after the tape is pulled out. The guide posts 20 and 21 are mounted respectively on guide members 20' and 21'. The guide members 20' and 21' engage groove parts formed by the drum base 19 and a guide rail 24 and are arranged to be driven from the cassette loading position A to the recording and reproducing position B by gear parts 22' and 23', which are arranged to mesh with the gear part 10a of the loading lever 10 (shown in FIG. 3).

Thus, the gears 22' and 23' are rotated respectively by a swing motion of the loading lever 10 to cause the guide members 20' and 21' to move along the guide rail 24 through link mechanisms 22 and 23 mounted on the gears 22' and 23'. The supply-side main slanting post 38 is formed on the drum base 19.

The link mechanisms 22 and 23, which are arranged to drive the guide members 20' and 21', are formed integrally with the gear parts 22' and 23', respectively, and are pivotally supported by the drum base 19 in such a way as to be swingable around the center axes of the gear parts 22' and 23'.

The guide rail 24 is fixed to the drum base 19, and the guide post driving mechanism is fixed to the main chassis 1 in a unitized state. At the time of assembly, the gear parts 22' and 23' (shown in FIG. 4) are mounted in such a way as to be located on the reverse side of the main chassis 1 through the cutout 1' (shown in FIG. 3) which is provided for mounting the guide post driving mechanism.

As shown in FIG. 5, the drum base 19, the guide rail 24, the guide posts 20 and 21, the guide members 20' and 21' and the link mechanisms 22 and 23 are disposed on the upper surface side of the main chassis 1. On the other hand, the gear parts 22' and 23' are arranged to engage the loading lever 10 on the reverse side of the main chassis 1. Further, the gear parts 22' and 23' are coupled respectively to the link mechanisms 22 and 23 through the cutout 1' which is provided in the main chassis 1 for mounting the guide post driving mechanism.

Further, the supply-side guide member 20' and the take-up-side guide member 21' are composed of the same member.

Figure 7:
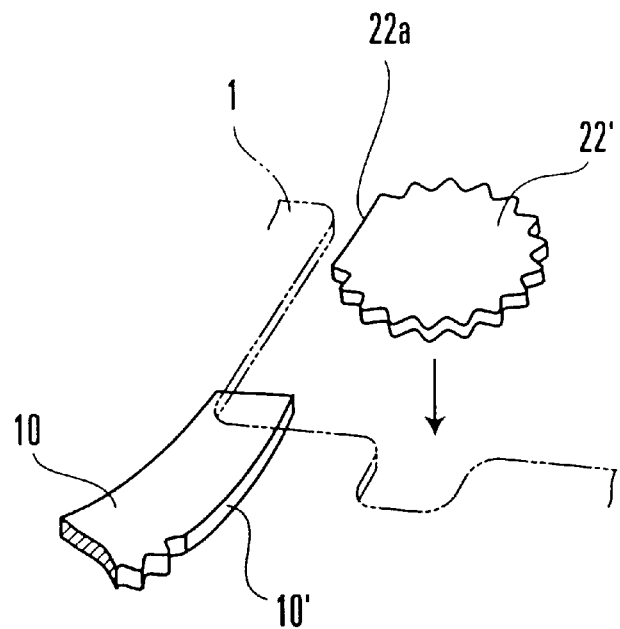
FIG. 7 is a diagram showing the manner of meshing gears with each other in assembling the guide post driving mechanism.

FIG. 7 is a diagram showing the manner of meshing gears with each other in assembling the guide post driving mechanism. The mounting of the guide post driving mechanism is performed in an unloading state in such a way as to have a cam part 10' of the loading lever 10 engage a cam part 22*a* formed on the gear part 22'.

Figure 8:
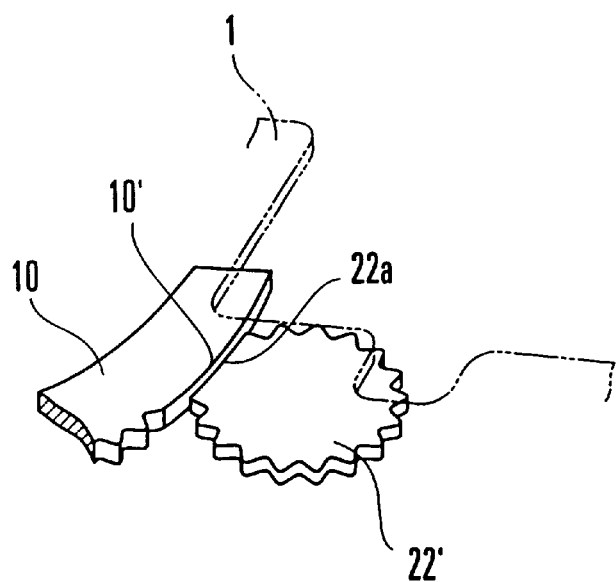
FIG. 8 is a diagram showing an engaging state of the gears in the guide post driving mechanism shown in FIG. 7.

FIG. 8 is a diagram showing an engaging state of the cam part 10' of the loading lever 10 and the cam part 22*a* of the gear part 22' in the guide post driving mechanism shown in FIG. 7.

Figure 9:
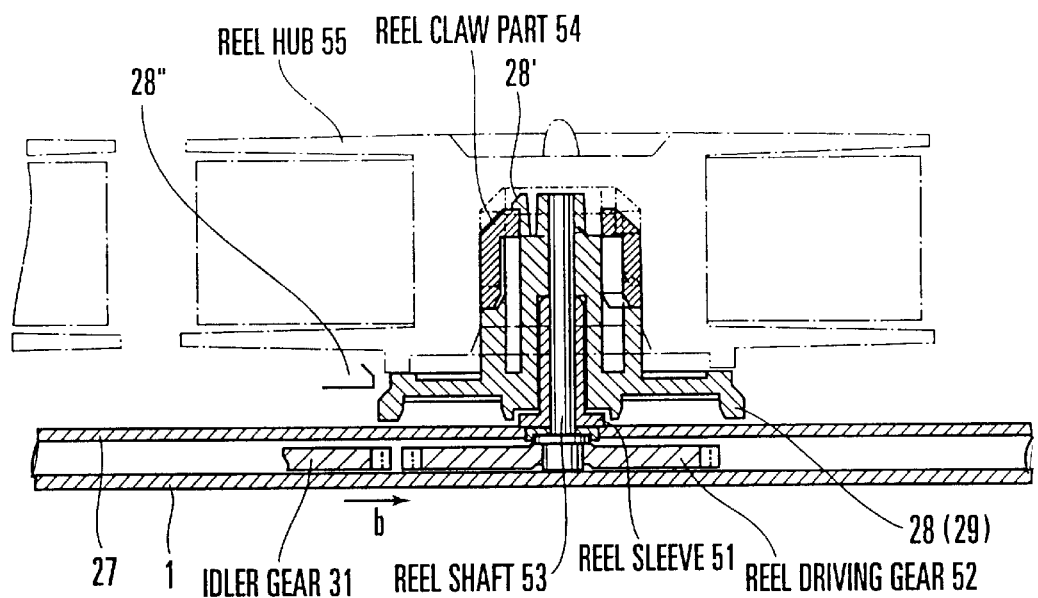
FIG. 9 is a diagram showing the structural arrangement of a reel mount in the embodiment.

FIG. 9 shows in detail a reel mount mechanism in the embodiment. Referring to FIG. 9, a reel sleeve 51 is mounted on the slide chassis 27. A reel driving gear 52 is provided for driving the supply-side reel mount 28 (or the take-up-side reel mount 29). The reel driving gear 52 has a reel shaft 53 secured thereto by caulking. The reel shaft 53 is fitted in the reel sleeve 51, which is press-fitted in the reel mount 28 (or 29).

Thus, the supply-side reel mount 28 (or the take-up-side reel mount 29), serving as a tape transport means, is disposed on the upper surface side of the slide chassis 27, while the supply-side (or take-up-side) reel driving gear 52, serving as a driving means, is disposed between the slide chassis 27 and the main chassis 1.

Referring further to FIG. 9, a reel claw part 54 is under an upward urging force of a spring (not shown). However, the upward movement of the reel claw part 54 is restricted by a stopper claw part 28' of the reel mount 28 (or 29). Reference numeral 55 denotes a reel hub 55, which meshes with the reel mount 28 (or 29). Further, reference numeral 28" denotes a brake press-contact part, which is arranged to act for the reel mount 28 (or 29).

Figure 10:
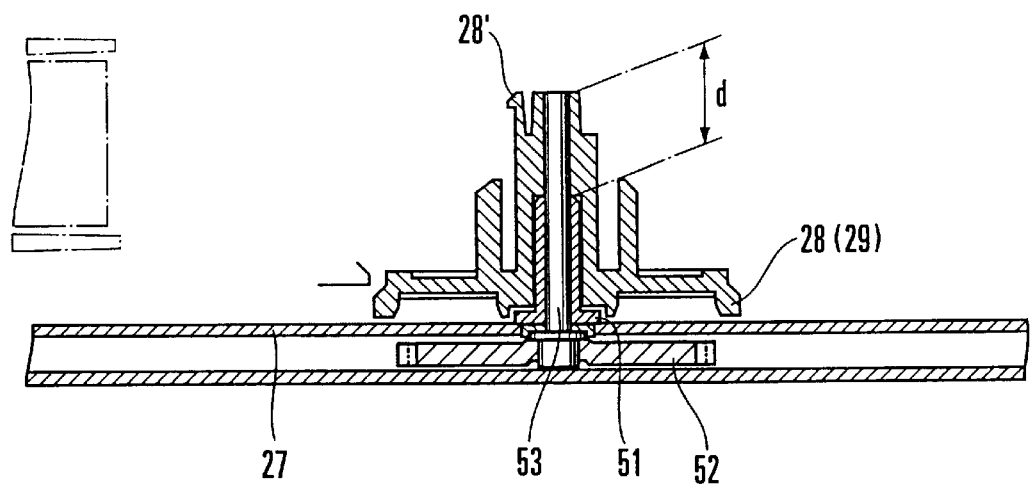
FIG. 10 is a diagram showing in detail a press-fitting part of a reel shaft shown in FIG. 9.
Figure 11A:
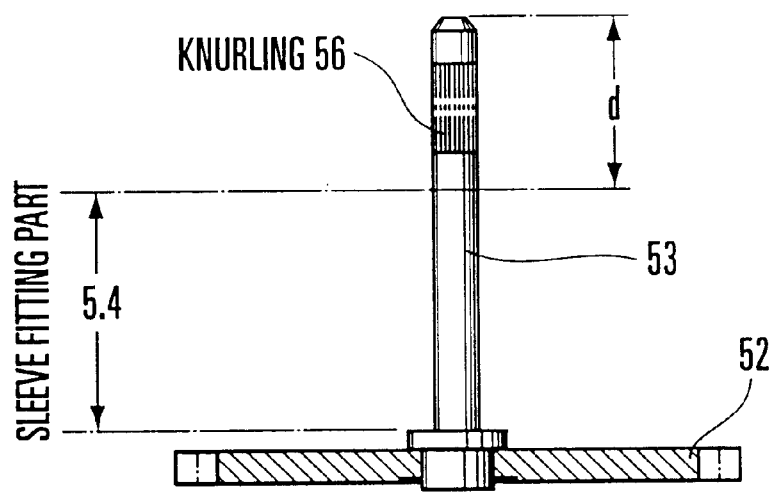
FIGS. 11($a$) and 11($b$) are a detail view and a sectional view, respectively, showing a knurling part provided at the press-fitting part of the reel shaft shown in FIG. 10.
Figure 11B:
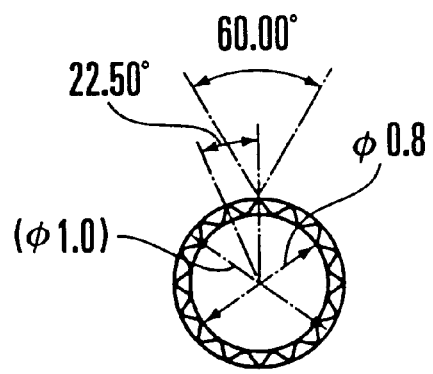

FIG. 10 shows in detail the press-inserting part of the reel shaft 53. As shown in FIG. 10, the reel mount 28 (or 29) is press-fitted on the reel shaft 53.

FIGS. 11(*a*) and 11(*b*) show in detail a knurling part of the press-inserting part of the reel shaft 53. As shown in FIG. 11(*a*), the reel shaft 53 has a knurling surface 56 at the press-inserting part "d" for antislipping. FIG. 11(*b*) is an enlarged sectional view showing the details of the knurling part. By the knurling surface 56, the reel mount 28 (or 29) is prevented from turning or slipping after press-fitting.

Figure 12:
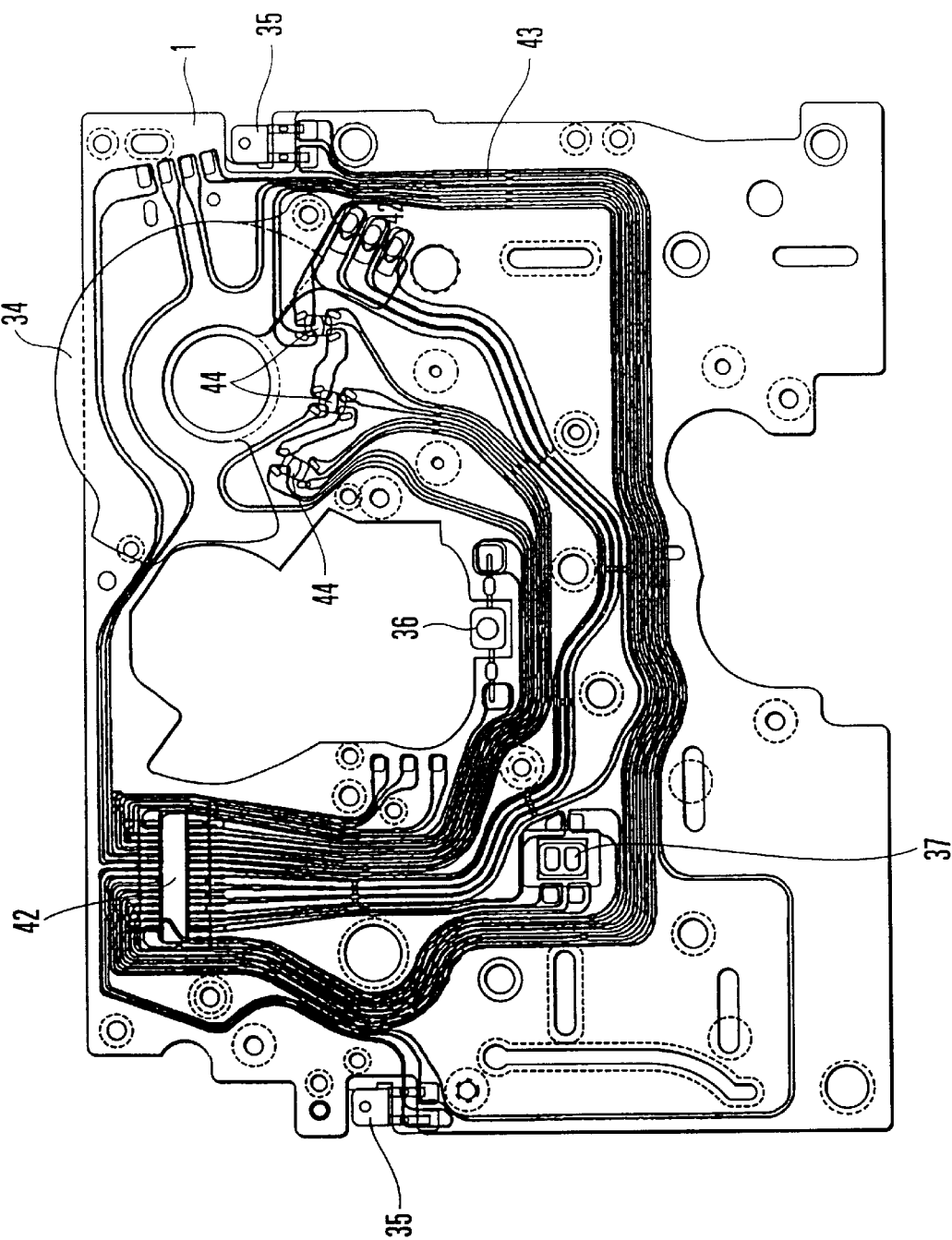
FIG. 12 is a top look-through view showing the main chassis in the embodiment.

FIG. 12 is a look-through view showing the main chassis 1 as viewed from the upper surface side of the main chassis 1. An electric circuit pattern 43 is formed directly on the main chassis 1. There are further provided a driving coil 34 of the capstan motor, Hall elements 44, and various sensor elements 35, 36 and 37. The main chassis 1 is made of a silicon steel plate and is arranged to serve as a stator yoke for the capstan 3.

Figure 13:
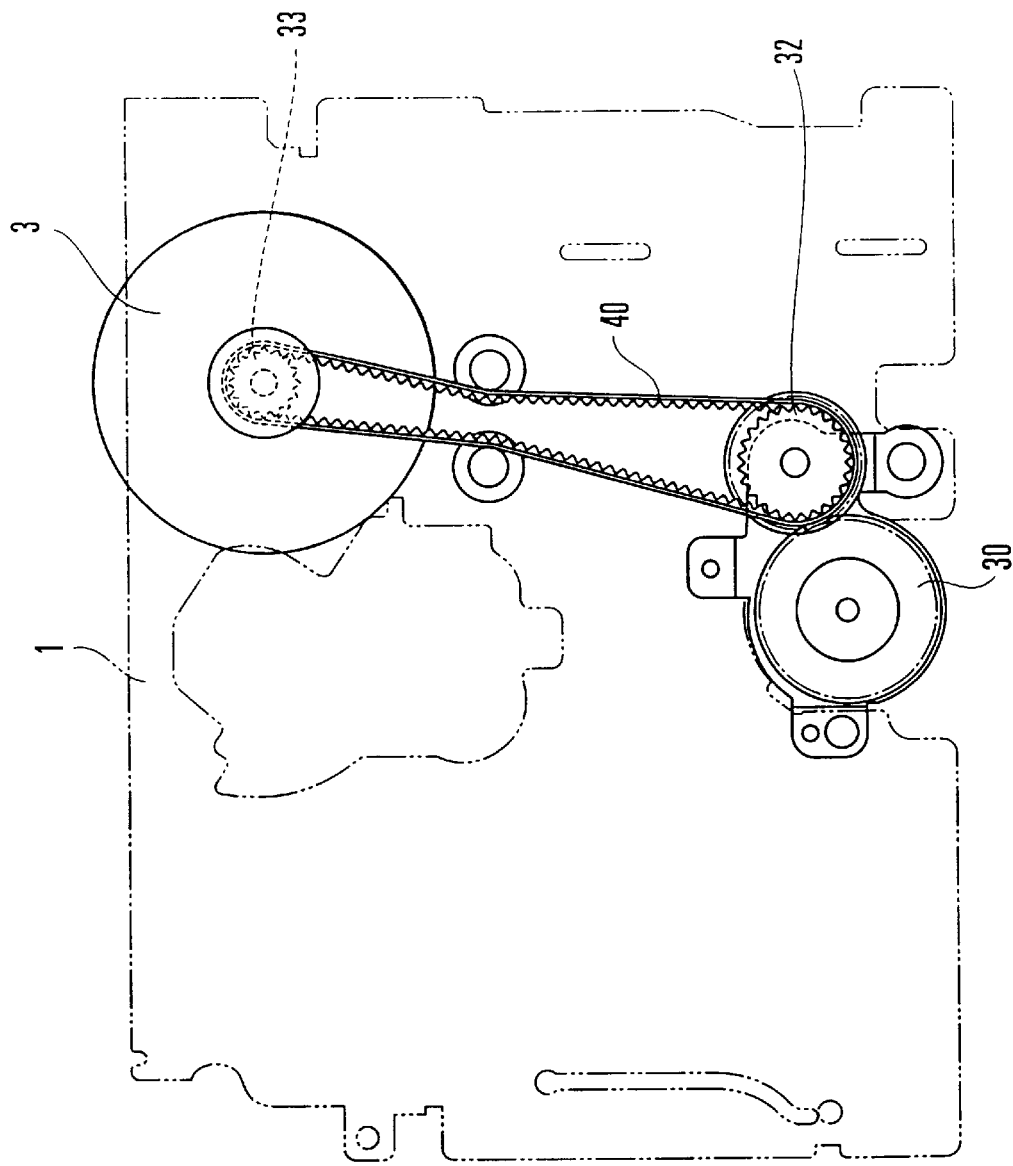
FIG. 13 is a look-through view showing a capstan motor part as viewed from the surface of the chassis in the embodiment.

FIG. 13 is a look-through view showing a capstan motor part as viewed from the upper surface side of the main chassis 1. Referring to FIG. 13, the rotation of the capstan 3 is transmitted from the first pulley 33, which is formed to be coaxial with the capstan 3, to the second pulley 32 through the timing belt 40. Then, the rotation of the capstan 3 is further transmitted through the drive gear 30 to the idler gear 31 and the reel mount 28 or 29. The timing belt 40 is extended from the first pulley 33, which is disposed at an opening part of the driving coil 34 of the capstan motor, to the second pulley 32.

Figure 14:
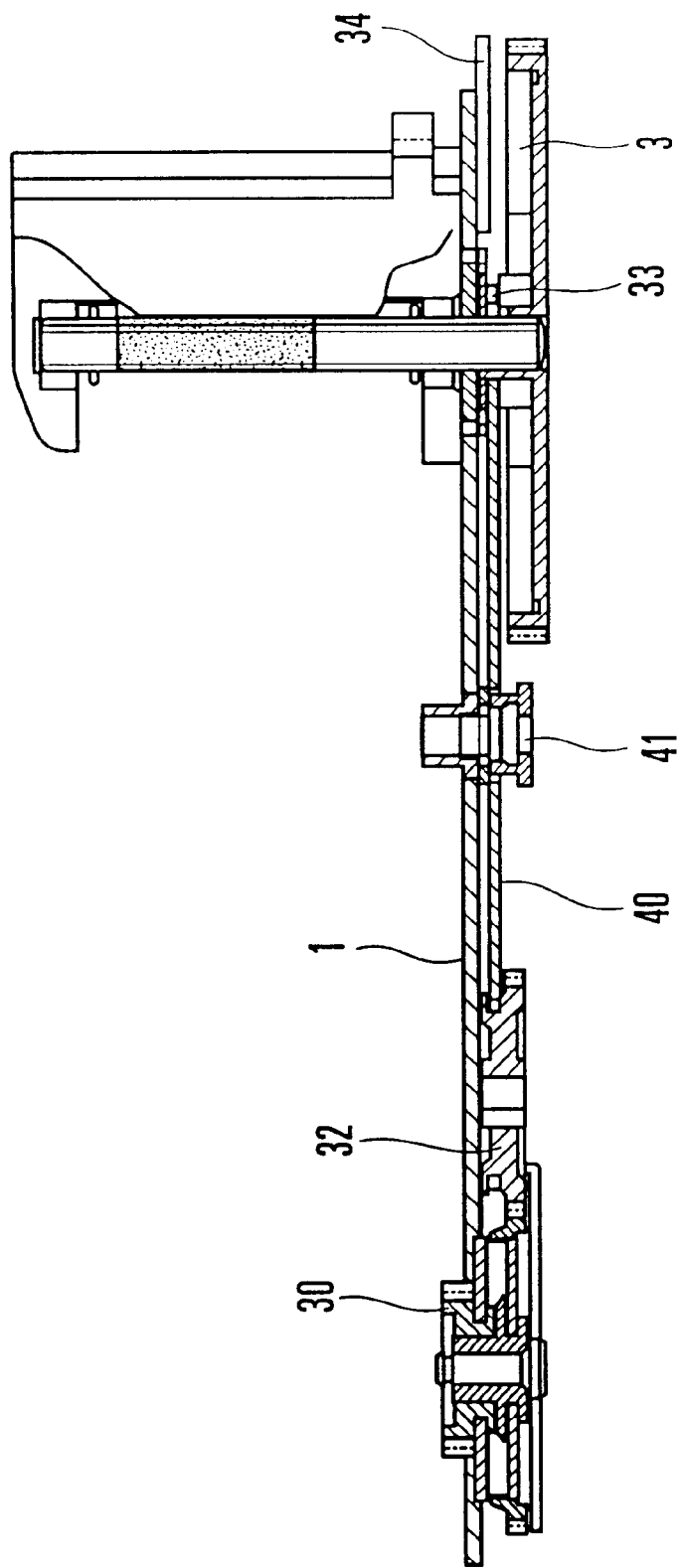
FIG. 14 is a side view showing the arrangement of the capstan motor part in the embodiment.

FIG. 14 is a side view showing the capstan motor part. As shown in FIG. 14, the timing belt 40 is located between the rotor of the capstan 3 and the main chassis 1 at about the same height as the driving coil 34 of the capstan motor. The arrangement for obtaining the rotating force of the capstan 3 from the first pulley 33, which is coaxial with the capstan 3, not only reduces disturbance torque on the capstan 3 but also permits a reduction in thickness of the capstan motor part by passing the timing belt 40 between the rotor of the capstan motor and the main chassis 1. It is another advantage that the arrangement effectively lessens the frequency of noise due to intermeshing of gears.

Figure 15:
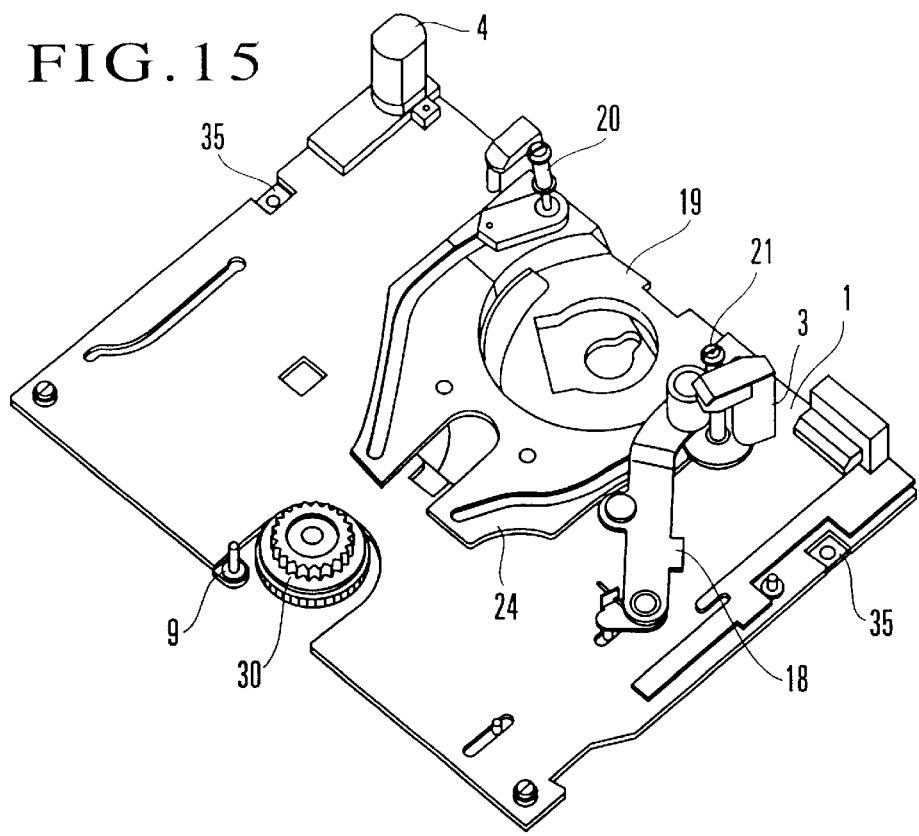
FIG. 15 is a perspective view showing a capstan unit and a mechanism part on the surface of the main chassis.

FIG. 15 is a perspective view showing a capstan unit and a mechanism part on the surface of the main chassis 1. As shown in FIG. 15, on the upper surface of the main chassis 1, there are disposed the guide post driving unit composed of the guide posts 20 and 21, the drum base 19, etc., the pinch roller 18, the loading motor 4, and a gear part of the drive gear 30 which meshes with the idler gear 31.

Figure 16:
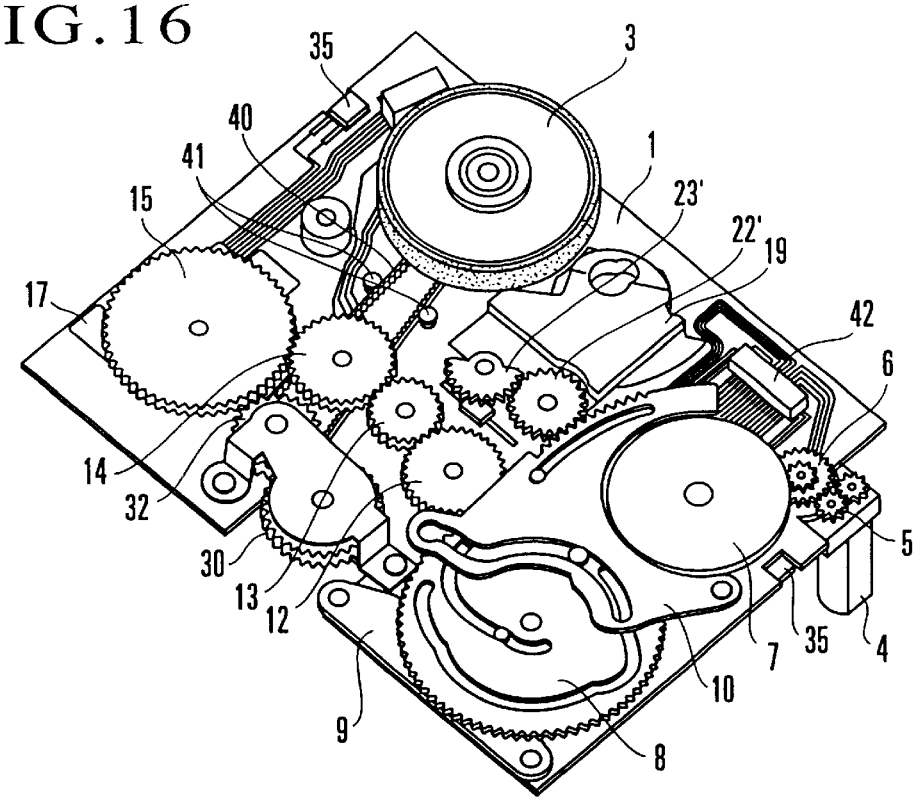
FIG. 16 is a perspective view showing the arrangement of the reverse side of the main chassis.

FIG. 16 is a perspective view showing the arrangement of the reverse side of the main chassis 1. As shown in FIG. 16, on the reverse side of the main chassis 1, there are disposed a mode switch 42, the pinch driving lever 17, the loading lever 10, the slide lever 9, etc.

Figure 17:
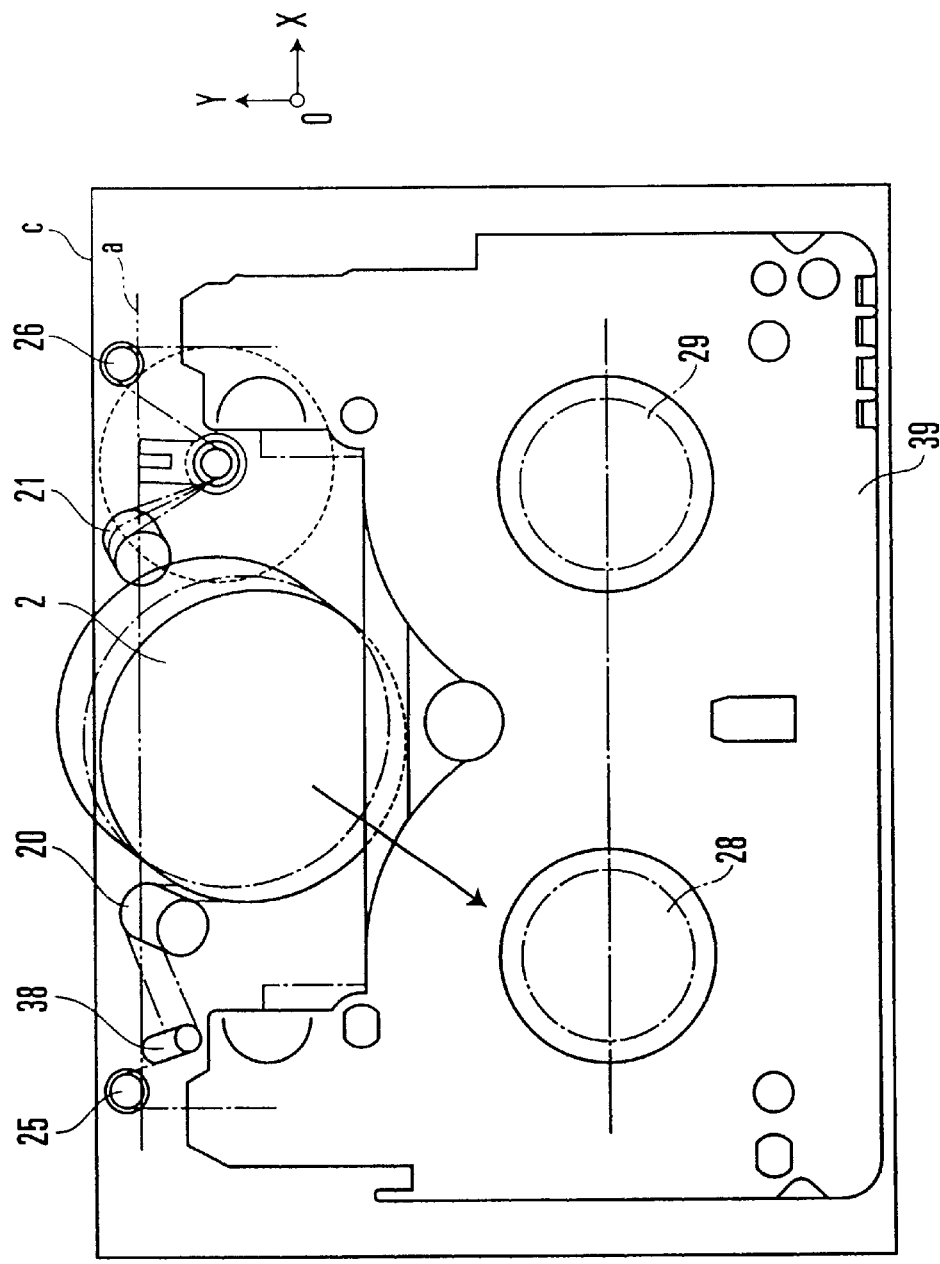
FIG. 17 is a plan view showing a tape path in the embodiment.
Figure 18:
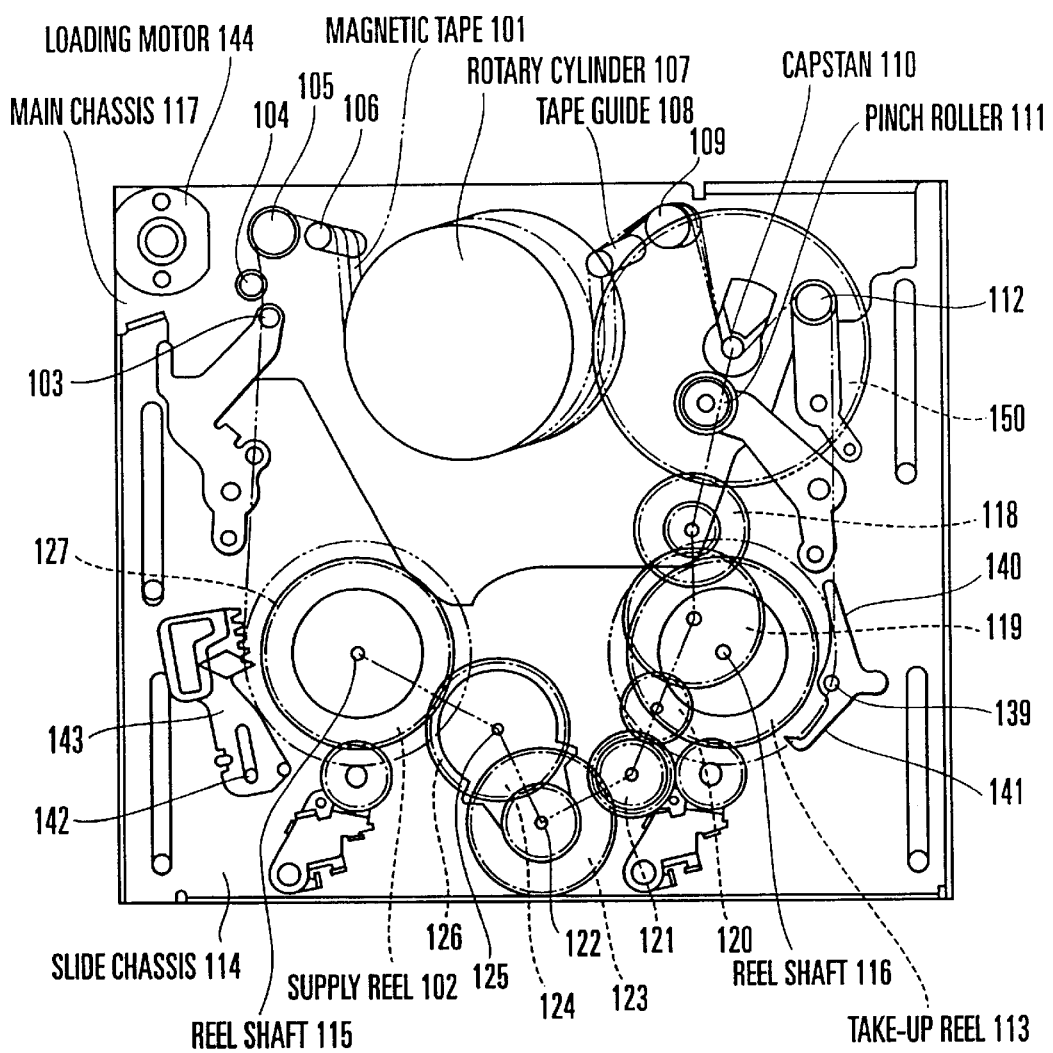
FIG. 18 is a plan view showing, by way of example, the arrangement of a conventional magnetic recording and reproducing apparatus.
Figure 19:
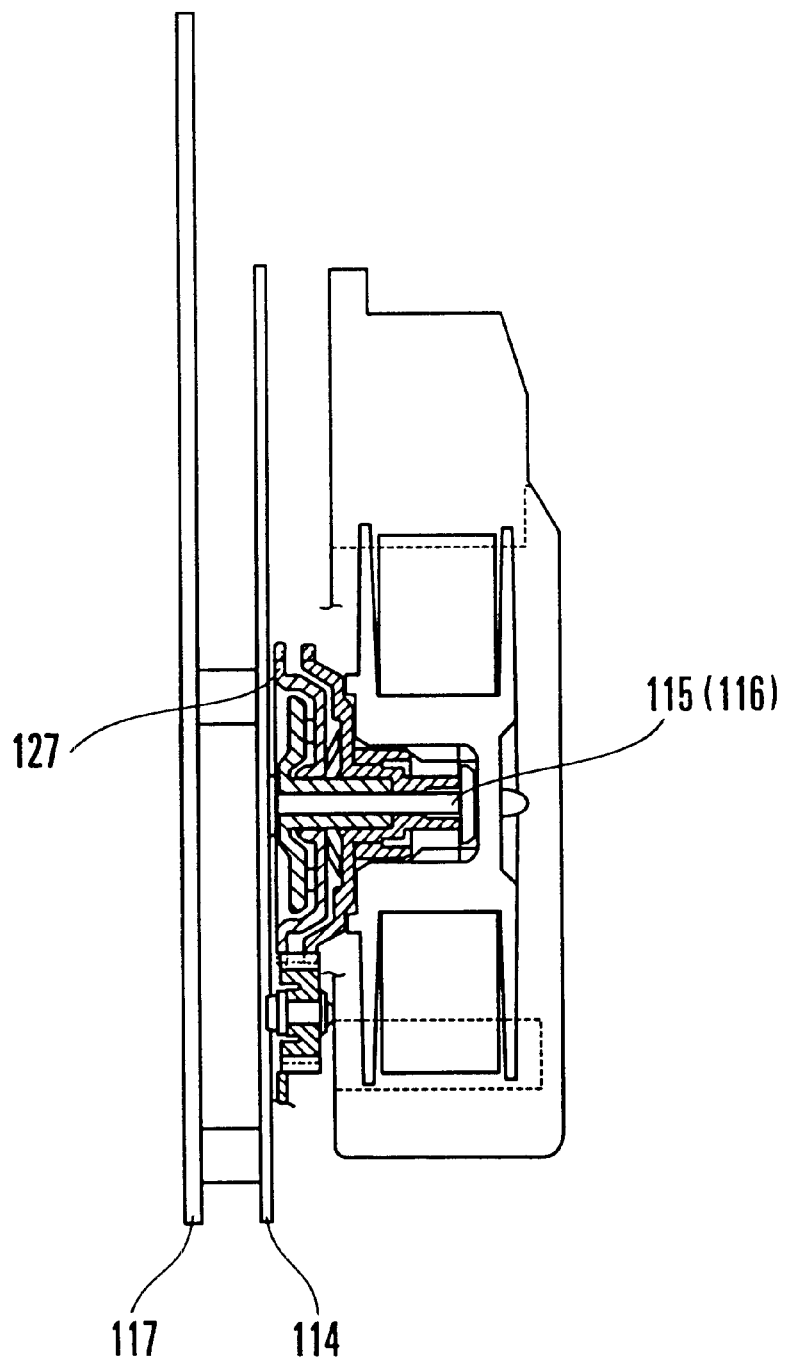
FIG. 19 is a side view showing a supply reel mount driving mechanism of the conventional magnetic recording and reproducing apparatus shown in FIG. 18.
Figure 20A:
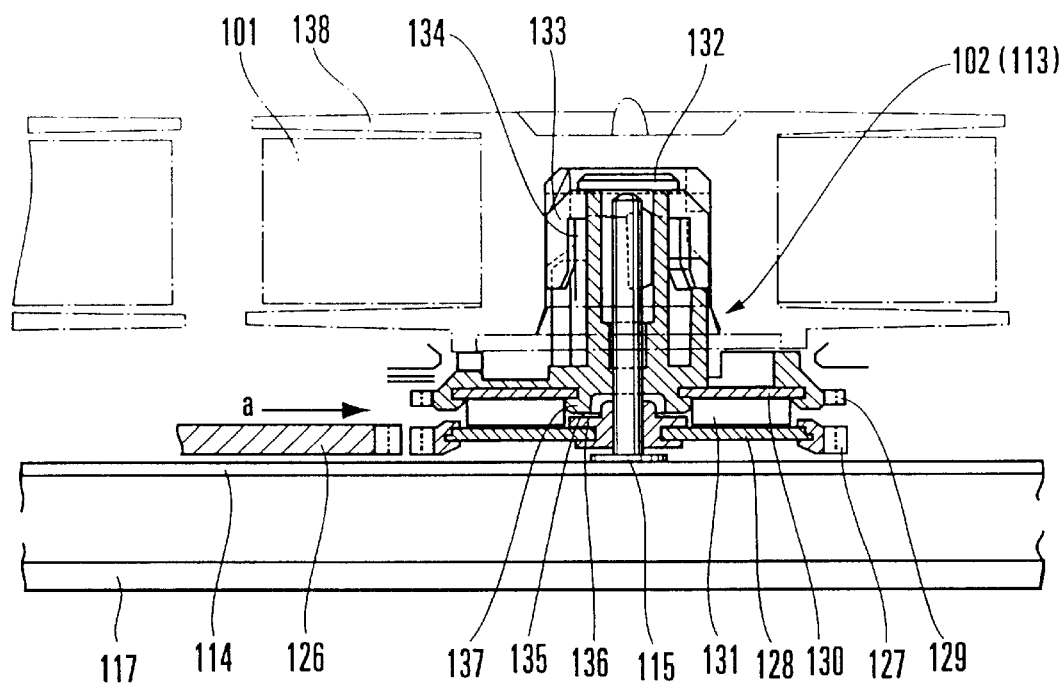
FIGS. 20($a$) and 20($b$) are an enlarged side view and a top view, respectively, of the supply reel mount driving mechanism shown in FIG. 19.
Figure 20B:
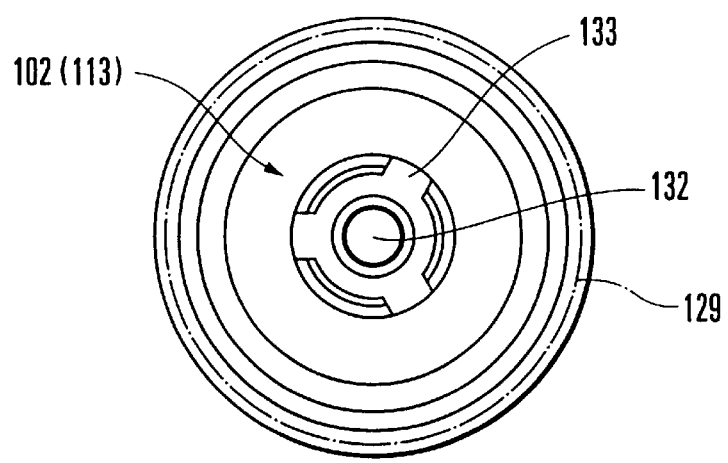

FIG. 17 is a diagram showing a tape path in the embodiment. The tape path will be described in detail later herein.

Next, the actions of various parts in the embodiment will be described with reference to the above-mentioned figures.

When the cassette 39 is loaded on the VTR, the loading of the cassette 39 is detected, and the loading motor 4 (shown in FIG. 3) rotates. The rotation of the loading motor 4 causes the first cam gear 8 to rotate through the gears 5, 6 and 7. The rotation of the first cam gear 8 causes the slide lever 9 and the loading lever 10 to swing in the directions of arrows shown in FIG. 3. The swing of the slide lever 9 in the direction of the arrow causes the slide chassis 27 (shown in FIG. 27) to move from the cassette loading position to the recording and reproducing position.

Then, the tension post 25 and the take-up side pull-out post 26 (shown in FIGS. 1 and 17) are caused, by the change in their positions relative to cams (not shown) formed on the main chassis 1, to pull the tape out from the cassette 39 by moving ahead of the cassette 39 from inside a mouth provided at the front of the cassette 39.

With the loading lever 10 caused to swing, the gear part 10*a* formed on the loading lever 10 drives the gears 22' and 23' for the guide members 20' and 21' to move the guide posts 20 and 21 along the groove parts of the guide rail 24 and the groove parts of the drum base 19 from the inside of the cassette mouth (the position A) to the recording and reproducing position (the position B), thereby causing the tape, which has been stowed inside the cassette 39, to be wrapped around the periphery of the rotary drum 2 to bring about a recordable and reproducible state. Then, the guide posts 20 and 21 are fixed by the positioning parts of the drum base 19.

The driving force of the loading motor 4 is transmitted further to the second cam gear 15 through the relay gears 12, 13 and 14 shown in FIG. 3. The second cam gear 15 then drives the pinch driving lever 17 to cause the pinch roller 18 to be pressed against or moved away from the capstan 3.

The tape, which has been pulled out from the cassette 39 and wrapped around the rotary drum 2 by the force of the loading motor 4, is transported jointly by the capstan 3 and the pinch roller 18.

In this instance, the rotating force of the capstan 3 is transmitted to the second pulley 32 through the timing belt 40 (shown in FIG. 1). The rotating force of the second pulley 32 is transmitted to the take-upside reel mount 29 through the drive gear 30 and the idler gear 31. Accordingly, the tape, which is being transported by the capstan 3 and the pinch roller 18, is taken up inside the cassette 39 by the take-up-side reel mount 29.

Incidentally, the drive gear 30 is provided with a clutch mechanism for setting a limited amount of torque for the rotating force transmitted to the idler gear 31, so that the rotating force is transmitted at a fixed amount of torque.

Further, a tape winding action in the embodiment is performed as follows. The idler gear 31 is moved in the direction of an arrow "b", shown in FIG. 9, by the rotating force transmitted through the drive gear 30, etc., as mentioned in the foregoing, and then meshes with the reel mount 28 (or 29). The force thus transmitted to the reel mount 28 (or 29) causes the reel hub 55, which is in mesh with the reel claw part 54, to rotate in such a way as to take up the tape which is wound the reel hub 55.

In addition, the tape path in the embodiment is arranged as follows. Referring to FIG. 17, in loading the cassette 39, the tape pull-out posts (the tension post 25, the supply-side guide post 20, the take-up-side guide post 21 and the take-up-side pull-out post 26), which are located inside the mouth of the cassette 39, perform a tape loading action to wrap the tape around the rotary drum 2 by pulling the tape out from the cassette 39. Upon completion of loading, such a tape path as shown in FIG. 17 is formed.

In the recordable and reproducible state thus obtained, on a line "a" connecting the center of a lower flange of the supply-side guide post 20 to the center of an upper flange of the take-up-side guide posit 21, there are located the other pull-out posts 25 and 26, etc. The line "a" is arranged to be approximately parallel with a straight line connecting the center of the supply-side reel mount 28 to the center of the take-up-side reel mount 29 and to be located between the center of the drum 2 and an end surface "c" of the main chassis 1.

In this instance, assuming that the line "a" is an X axis in an X-Y axis rectangular coordinate system having positive values on the right side of the system, the rotary drum 2 inclines toward the third quadrant.

In the embodiment, as described above, the guide post driving mechanism is unitized. A power driving part of the unit is arranged to be located on the reverse side of the main chassis, while a guide member driving part of the unit is arranged to be located on the upper surface side of the main chassis. This arrangement effectively prevents lubricative grease or the like used for the power driving part from coming to stick to the tape guides. The embodiment thus eliminates the possibility of such troubles as jamming of the tape and clogging of the head.

Further, the embodiment facilitates assembly work, because the guide post driving mechanism can be mounted in a unitized state from the surface of the main chassis.

Further, the chassis is arranged to be located between the reel mounts and the reel mount driving system composed of the drive gear, the idler gear, etc. Therefore, the reel mount driving mechanism can be simply arranged without having any clutch mechanism incorporated therein. This arrangement permits a reduction in number of necessary parts and the thickness of the mechanism.

Since the chassis is arranged to be used also as the stator yoke for the capstan, the arrangement permits a reduction in space required for mounting the capstan and eventually permits a reduction in size of the apparatus. Further, since the sensors of varied kinds are arranged to be mounted directly on the chassis, one and the same wiring part can be used for both the capstan and the chassis. This arrangement permits a reduction in cost.

Further, the reel driving force of the capstan is taken out from between the rotor and the stator yoke by using the pulleys. This arrangement gives excellent characteristics and also permits a reduction in thickness. The pulleys on the driving and driven sides are arranged to be both supported by the stator yoke of the capstan. This arrangement permits the timing belt to be mounted in an operable state to solve problems such as obstructive dangling of the timing belt from the capstan or inconstant test results due to different ways of hanging the timing belt at the time of inspection.

Further, the pinch-roller pressing mechanism must have an adequate rate of angular precision of inclination relative to the capstan. The required rate of precision, however, can be easily attained as the capstan and the pinch-roller pressing mechanism are arranged on the same base.

Requirements in respect of noises and vibrations have recently become severe. However, since the stator yoke is arranged to be formed with a metal base, the vibrations of the chassis can be adequately suppressed.

In the embodiment of the invention, as has been described in the foregoing, the guide post driving mechanism has its power driving part and its guide member driving part disposed respectively on different sides of the chassis. Therefore, lubricative grease or the like used for the power driving part is prevented from sticking to the tape guides, etc., so that the possibility of troubles such as jamming of the tape and the clogging of the head can be effectively eliminated.

With the guide post driving mechanism unitized, the mechanism can be mounted from the surface side of the main chassis. This arrangement facilitates assembly work.

With the chassis disposed between the tape transport means and the driving means for driving the tape transport means, the reel mount driving mechanism can be simply arranged, without including any clutch mechanism therein, to permit a reduction in thickness as a whole. The reel mount driving mechanism, therefore, can be designed to permit a reduction in cost.

Further, the arrangement for using the main chassis also as the stator yoke of the capstan obviates the necessity of having a capstan mounting space. This arrangement is an advantage for a reduction in size of the apparatus. In addition, the sensors of varied kinds are arranged to be mounted directly on the chassis. This arrangement permits a reduction in cost because one wiring part can be used both for the capstan and the chassis.

What is claimed is:

1. A magnetic recording and reproducing apparatus for performing recording and reproduction on or from a tape-shaped recording medium, comprising:

a chassis;

a slide chassis supported to be slidable relative to said chassis;

tape transport means for transporting the tape-shaped recording medium; and driving means for driving said tape transport means, wherein said slide chassis is disposed between said tape transport means and said driving means, and said driving means is disposed between said slide chassis and said chassis.

2. A magnetic recording and reproducing apparatus according to claim 1, wherein said tape transport means includes a reel arranged to take up the tape-shaped recording medium, a reel mount, and a reel brake press-contact part.

3. A magnetic recording and reproducing apparatus according to claim 2, wherein said driving means includes a reel mount driving gear for driving said reel mount, and an idler gear arranged to selectively mesh with said reel mount driving gear.

4. A magnetic recording and reproducing apparatus according to claim 3, wherein a reel shaft fixed to said reel mount driving gear is press-fitted into said reel mount and is provided with grooves for preventing said reel shaft from slipping from said reel mount.

* * * * *